(12) United States Patent
Soryal et al.

(10) Patent No.: US 12,587,280 B2
(45) Date of Patent: Mar. 24, 2026

(54) HYBRID ACCESS PLANE FUNCTION (HAPF) AS A SATELLITE AND CELLULAR CARRIER AGGREGATOR AND SLICING MANAGER

(71) Applicant: AT&T Intellectual Property I, L.P., Atlanta, GA (US)

(72) Inventors: Joseph Soryal, Glendale, NY (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 371 days.

(21) Appl. No.: 18/179,911

(22) Filed: Mar. 7, 2023

(65) Prior Publication Data

US 2024/0305374 A1 Sep. 12, 2024

(51) Int. Cl.
*H04B 10/118* (2013.01)
*H04B 7/185* (2006.01)

(52) U.S. Cl.
CPC ....... *H04B 10/118* (2013.01); *H04B 7/18513* (2013.01)

(58) Field of Classification Search
CPC .......................... H04B 10/118; H04B 7/18513
USPC ......................................................... 398/121
See application file for complete search history.

(56) References Cited

U.S. PATENT DOCUMENTS 11,979,188 B2 * 5/2024 Faulkner .............. H04B 10/294
2017/0155443 A1 * 6/2017 Haziza .................. G01S 5/0263

2019/0028197 A1 * 1/2019 Turner ................... H04B 7/195
2020/0119811 A1 * 4/2020 Kay ...................... H04B 10/118
2021/0092640 A1 * 3/2021 Ravishankar ....... H04L 47/6275
2024/0298238 A1 * 9/2024 Karmi ................... H04W 40/12
2024/0298241 A1 * 9/2024 Karmi ..................... H04L 45/22

FOREIGN PATENT DOCUMENTS

FI        20195413 A1 * 11/2020 ............ H04W 48/18

OTHER PUBLICATIONS

"Terahertz wireless could make spaceborne satellite links as fast as fiber-optic links", Hiroshima University; National Institute of Information and Communications Technology; Panasonic Corporation, Feb. 6, 2017, 3 pages.

(Continued)

*Primary Examiner* — Amritbir K Sandhu
(74) *Attorney, Agent, or Firm* — Guntin & Gust, PLC; Colin LaRose

(57)        ABSTRACT

Aspects of the subject disclosure may include, for example, receiving, from first, second, and third communication devices upon which respective first, second, and third components of a distributed application are installed, respective first, second, and third data indicative of one or more respective first, second, and third characteristics of the first, second, and third communication devices, wherein each of the first, second, and third communication devices is one of a plurality of communication devices associated with a communications network; selecting, based at least in part upon the first, second, and third data, one of the second communication device and the third communication device to include in a first communication path between the first communication device and a satellite; and facilitating a first communication session between the first communication device and the satellite via the first communication path. Other embodiments are disclosed.

20 Claims, 10 Drawing Sheets

200

(56)  References Cited

OTHER PUBLICATIONS

Civas, Meltem et al., "Terahertz Wireless Communications in Space", zrXiv:2110.00781v1 [cs.ET], Oct. 2, 2021, 7 pages.
Han, Huipeng et al., "Design of THz Space Application System", Journal of Computer and Communications; Institute of Telecommunication Satellite, China Academy of Space Technology, Beijing, China, http://www.scirp.org/journal/jcc; http://dx.doi.org/10.4236/jcc.2015.33011, Mar. 2015, 5 pages.

* cited by examiner

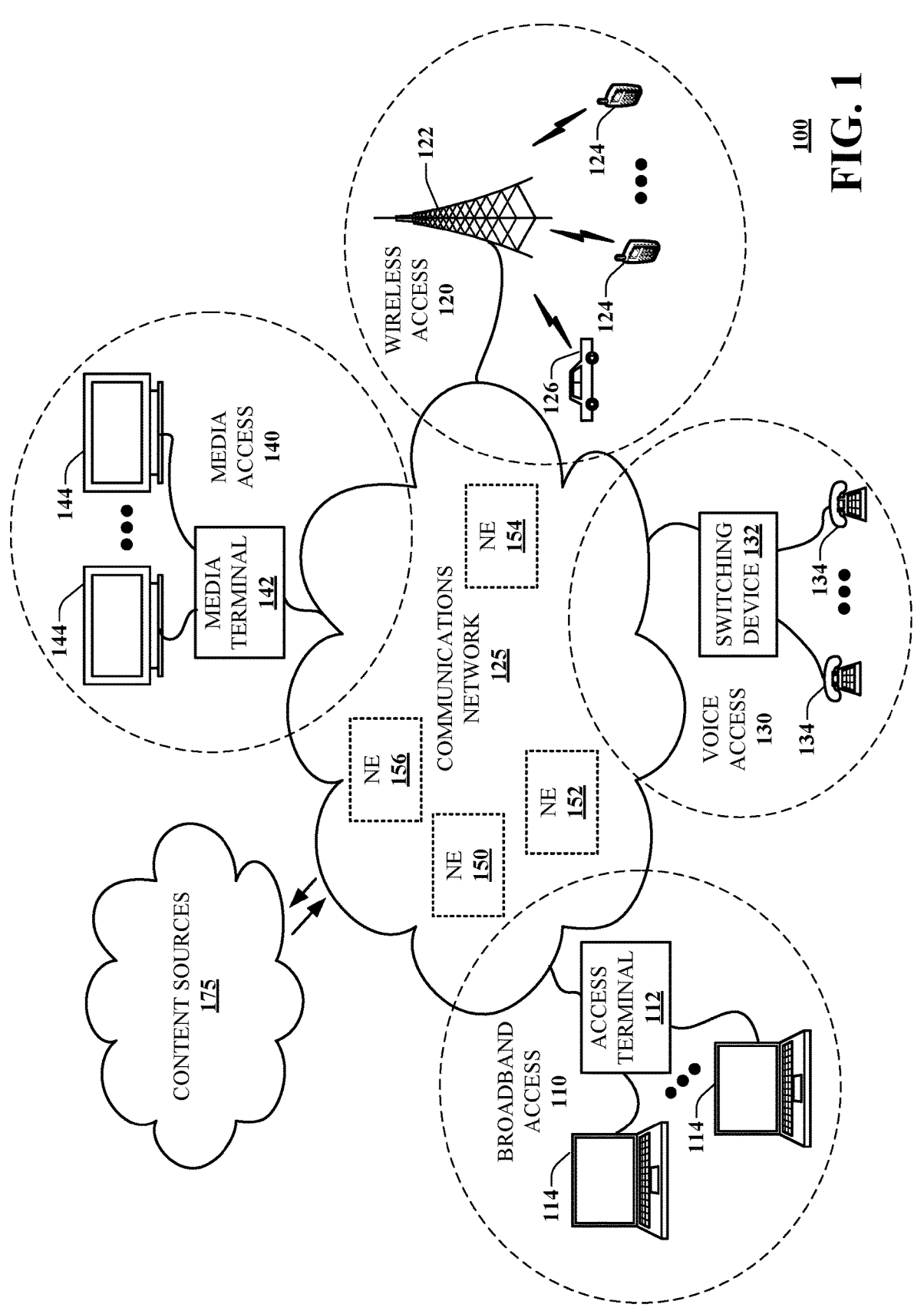
100 FIG. 1

200

250

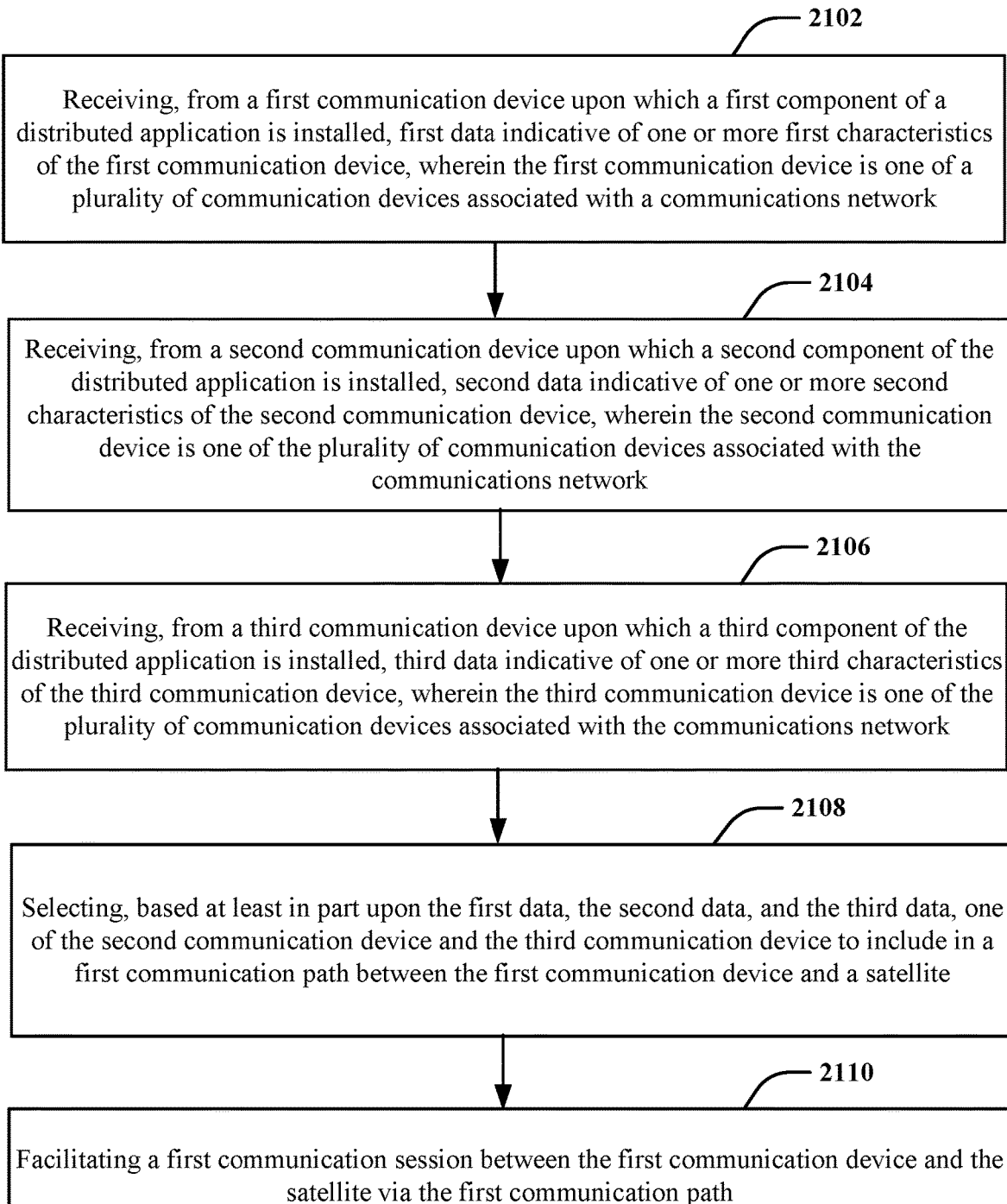

Receiving, from a first communication device upon which a first component of a distributed application is installed, first data indicative of one or more first characteristics of the first communication device, wherein the first communication device is one of a plurality of communication devices associated with a communications network

2102

Receiving, from a second communication device upon which a second component of the distributed application is installed, second data indicative of one or more second characteristics of the second communication device, wherein the second communication device is one of the plurality of communication devices associated with the communications network

2104

Receiving, from a third communication device upon which a third component of the distributed application is installed, third data indicative of one or more third characteristics of the third communication device, wherein the third communication device is one of the plurality of communication devices associated with the communications network

2106

Selecting, based at least in part upon the first data, the second data, and the third data, one of the second communication device and the third communication device to include in a first communication path between the first communication device and a satellite

2108

Facilitating a first communication session between the first communication device and the satellite via the first communication path

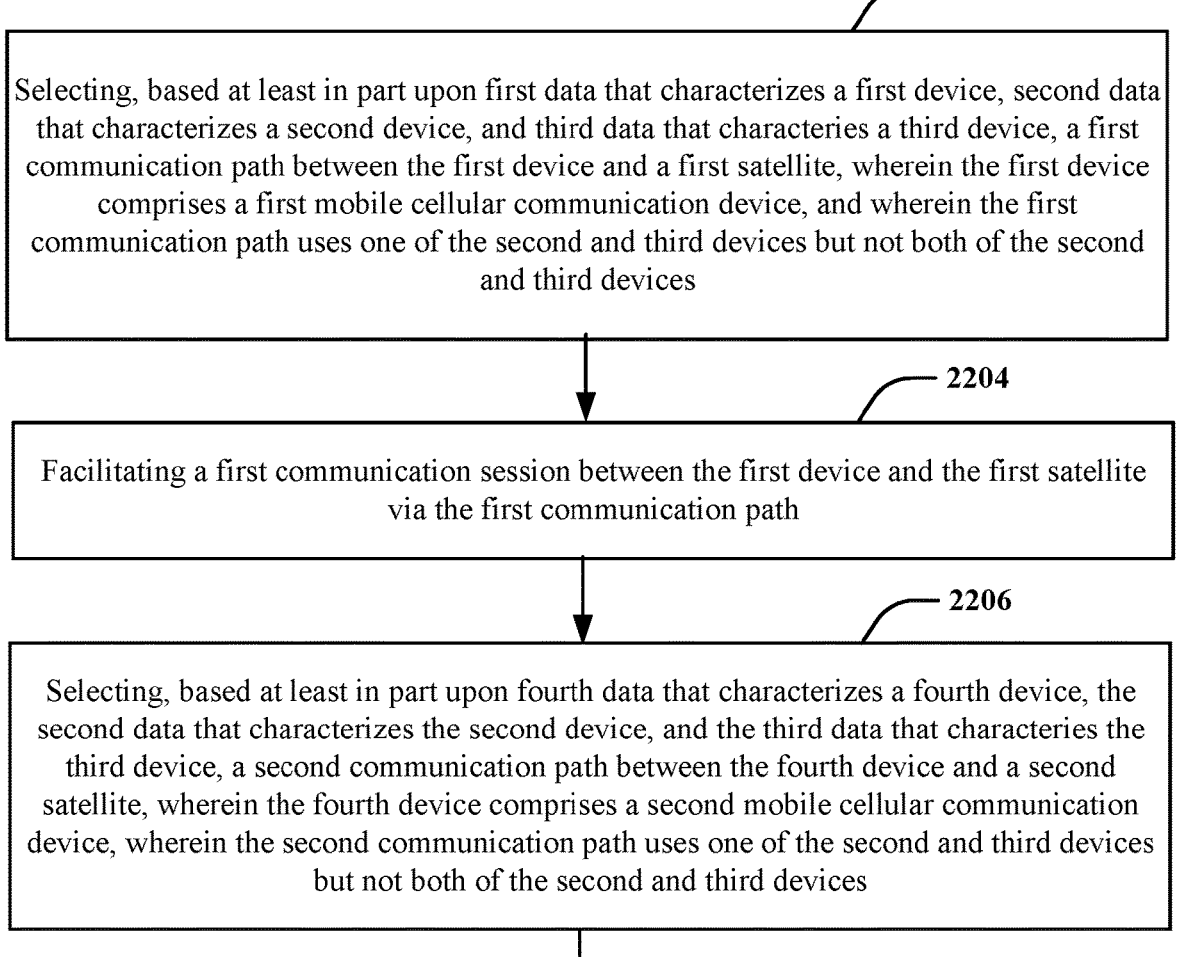

2202

Selecting, based at least in part upon first data that characterizes a first device, second data that characterizes a second device, and third data that characteries a third device, a first communication path between the first device and a first satellite, wherein the first device comprises a first mobile cellular communication device, and wherein the first communication path uses one of the second and third devices but not both of the second and third devices

2204

Facilitating a first communication session between the first device and the first satellite via the first communication path

2206

Selecting, based at least in part upon fourth data that characterizes a fourth device, the second data that characterizes the second device, and the third data that characteries the third device, a second communication path between the fourth device and a second satellite, wherein the fourth device comprises a second mobile cellular communication device, wherein the second communication path uses one of the second and third devices but not both of the second and third devices

2208

Facilitating a second communication session between the fourth device and the second satellite via the second communication path

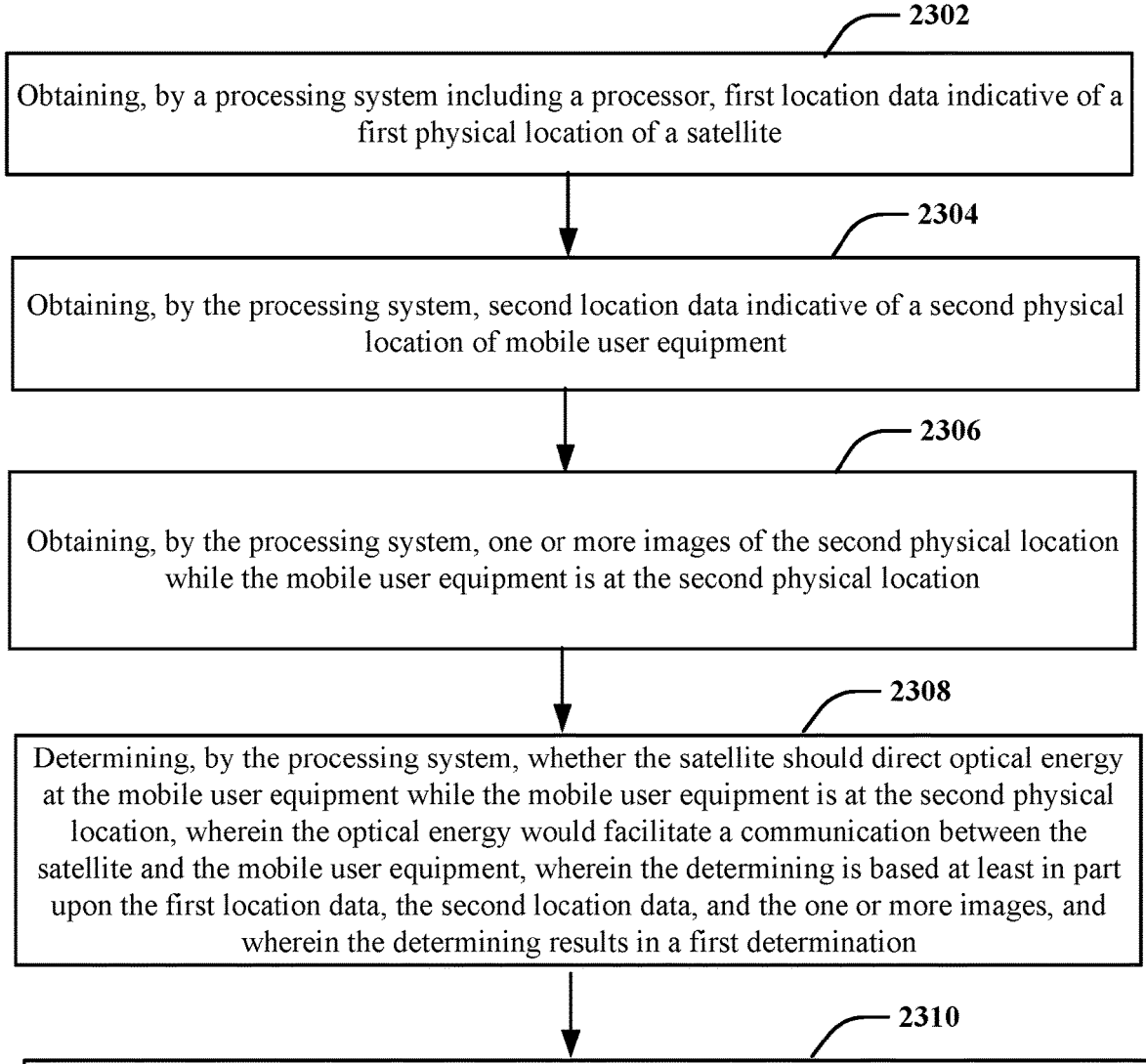

2302

Obtaining, by a processing system including a processor, first location data indicative of a first physical location of a satellite

2304

Obtaining, by the processing system, second location data indicative of a second physical location of mobile user equipment

2306

Obtaining, by the processing system, one or more images of the second physical location while the mobile user equipment is at the second physical location

2308

Determining, by the processing system, whether the satellite should direct optical energy at the mobile user equipment while the mobile user equipment is at the second physical location, wherein the optical energy would facilitate a communication between the satellite and the mobile user equipment, wherein the determining is based at least in part upon the first location data, the second location data, and the one or more images, and wherein the determining results in a first determination

2310

Responsive to the first determination being that the satellite should direct the optical energy at the mobile user equipment while the mobile user equipment is at the second physical location, instructing, by the processing system, the satellite to direct the optical energy at the mobile user equipment while the mobile user equipment is at the second physical location in order to effectuate the communication

HYBRID ACCESS PLANE FUNCTION (HAPF) AS A SATELLITE AND CELLULAR CARRIER AGGREGATOR AND SLICING MANAGER

FIELD OF THE DISCLOSURE

The subject disclosure relates to a hybrid access plane function (HAPF) as a satellite and cellular carrier aggregator and slicing manager.

BACKGROUND

There are three areas of earth orbit. Low Earth Orbit (LEO) is the closest to the Earth's surface and typically holds weather and climate satellites. Then there is the Medium Earth Orbit (MEO). The Global Positioning Satellites (or GPS) are in this space. The farthest away from the surface is the High Earth Orbit (HEO) (or geosynchronous). A HEO satellite travels at a speed such that the satellite monitors one area on earth and looks, to an observer on the earth, that the satellite is not moving.

There are also very small satellites (such as Micro, Nano, Pico, and Femto satellites), as well as satellites that will be using optical communications in the next generation (Tera-hertz Optical communications).

Various satellites of the kind described above can be used to facilitate earth-based communications.

BRIEF DESCRIPTION OF THE DRAWINGS

Reference will now be made to the accompanying drawings, which are not necessarily drawn to scale, and wherein:

FIG. 1 is a block diagram illustrating an example, non-limiting embodiment of a communication network in accordance with various aspects described herein.

FIG. 2C depicts an illustrative embodiment of a method in accordance with various aspects described herein.

FIG. 2D depicts an illustrative embodiment of a method in accordance with various aspects described herein.

FIG. 2E depicts an illustrative embodiment of a method in accordance with various aspects described herein.

DETAILED DESCRIPTION

Figure 2A:
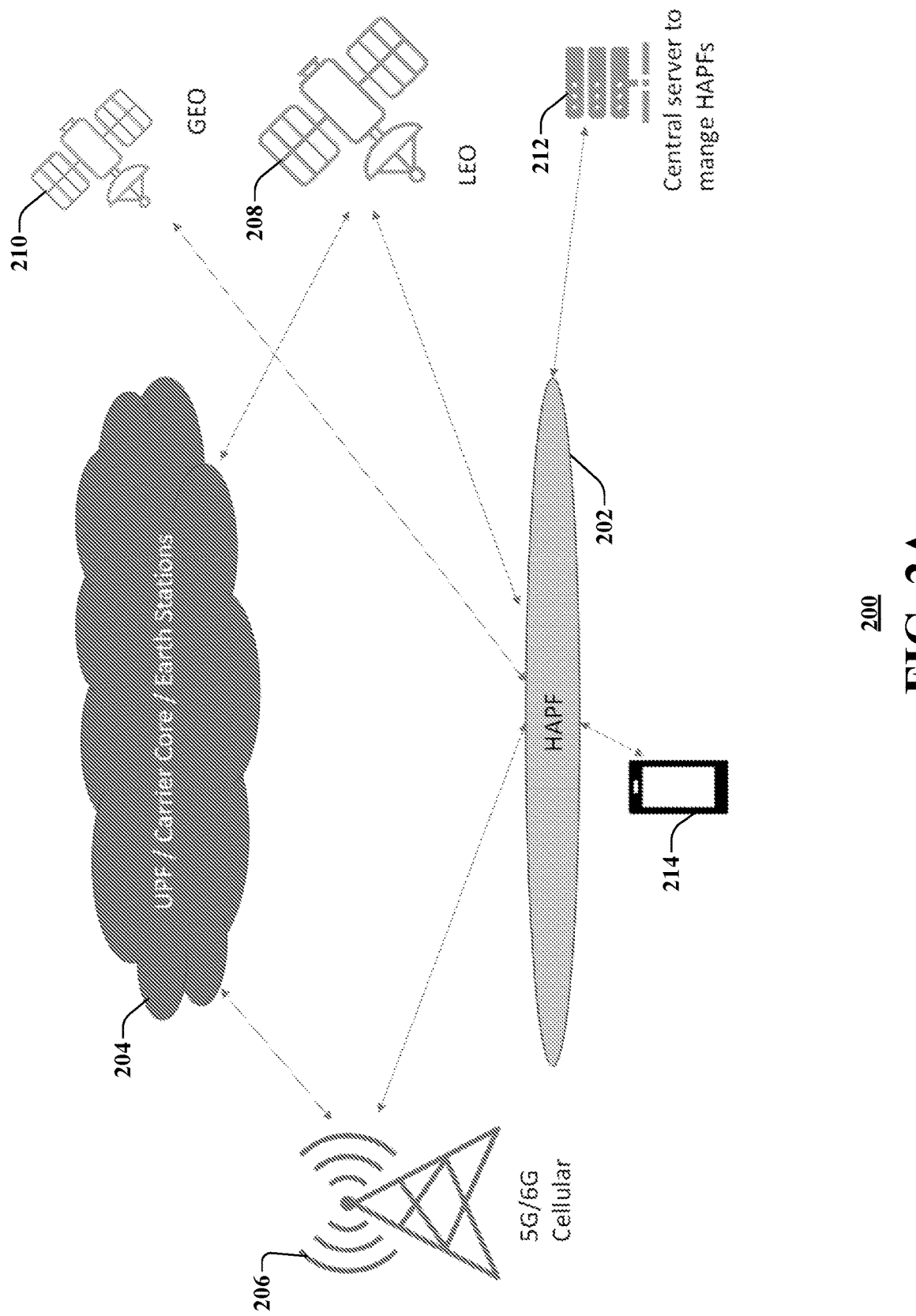
FIG. 2A is a block diagram illustrating an example, non-limiting embodiment of a system (which can function fully or partially within the communication network of FIG. 1) in accordance with various aspects described herein.

The subject disclosure describes, among other things, illustrative embodiments for hybrid access plane function (HAPF) as a satellite and cellular carrier aggregator and slicing manager. Other embodiments are described in the subject disclosure.

One or more aspects of the subject disclosure include a device comprising: a processing system including a processor; and a memory that stores executable instructions that, when executed by the processing system, facilitate performance of operations, the operations comprising: receiving, from a first communication device upon which a first component of a distributed application is installed, first data indicative of one or more first characteristics of the first communication device, wherein the first communication device is one of a plurality of communication devices associated with a communications network; receiving, from a second communication device upon which a second component of the distributed application is installed, second data indicative of one or more second characteristics of the second communication device, wherein the second communication device is one of the plurality of communication devices associated with the communications network; receiving, from a third communication device upon which a third component of the distributed application is installed, third data indicative of one or more third characteristics of the third communication device, wherein the third communication device is one of the plurality of communication devices associated with the communications network; selecting, based at least in part upon the first data, the second data, and the third data, one of the second communication device and the third communication device to include in a first communication path between the first communication device and a satellite; and facilitating a first communication session between the first communication device and the satellite via the first communication path.

One or more aspects of the subject disclosure include a non-transitory machine-readable medium comprising executable instructions that, when executed by a processing system including a processor, facilitate performance of operations, the operations comprising: selecting, based at least in part upon first data that characterizes a first device, second data that characterizes a second device, and third data that characteries a third device, a first communication path between the first device and a first satellite, wherein the first device comprises a first mobile cellular communication device, and wherein the first communication path uses one of the second and third devices but not both of the second and third devices; facilitating a first communication session between the first device and the first satellite via the first communication path; selecting, based at least in part upon fourth data that characterizes a fourth device, the second data that characterizes the second device, and the third data that characteries the third device, a second communication path between the fourth device and a second satellite, wherein the fourth device comprises a second mobile cellular communication device, wherein the second communication path uses one of the second and third devices but not both of the second and third devices; and facilitating a second communication session between the fourth device and the second satellite via the second communication path.

One or more aspects of the subject disclosure include a method comprising: obtaining, by a processing system including a processor, first location data indicative of a first physical location of a satellite; obtaining, by the processing system, second location data indicative of a second physical location of mobile user equipment; obtaining, by the processing system, one or more images of the second physical location while the mobile user equipment is at the second physical location; determining, by the processing system, whether the satellite should direct optical energy at the mobile user equipment while the mobile user equipment is at the second physical location, wherein the optical energy would facilitate a communication between the satellite and the mobile user equipment, wherein the determining is based at least in part upon the first location data, the second location data, and the one or more images, and wherein the determining results in a first determination; and responsive to the first determination being that the satellite should direct the optical energy at the mobile user equipment while the mobile user equipment is at the second physical location, instructing, by the processing system, the satellite to direct the optical energy at the mobile user equipment while the mobile user equipment is at the second physical location in order to effectuate the communication.

As described herein, various embodiments can provide an integral mechanism to enable a cellphone (and/or other user equipment (UE)) to communicate with multiple end points in a seamless manner.

As described herein, various embodiments can enable a virtual interface that aggregates all of multiple types of communications on a given UE.

As described herein, various embodiments can provide satellite communications for cellular handsets (and/or other UEs). Such satellite communications can be implemented via, for example, a new layer called Access Plane Function. The Access Plane Function can operate as an umbrella to aggregate the traffic from cellular networks and satellites onto the Internet backbone and vice versa.

As described herein, various embodiments can automatically offer carrier aggregation capability wherein an "anchor spectrum" is dynamic and hops between different types of: (a) Satellites (e.g., geostationary (GEO), medium earth orbit (MEO), low Earth orbit (LEO), Micro, Nano, Pico, Femto, etc.); and/or Cellular Networks with various generations (e.g., 4G, 5G, 6G, etc.).

As described herein, various embodiments can provide for innovative slicing mechanisms for carrier aggregation.

As described herein, various embodiments can provide for carrier aggregation mechanisms that compromise optical transport and/or cellular spectrum wireless transport.

As described herein, various embodiments can reduce (or eliminate) hard hand-offs.

As described herein, various embodiments can support service during outages for one or more network infrastructure elements.

Referring now to FIG. 1, a block diagram is shown illustrating an example, non-limiting embodiment of a system 100 in accordance with various aspects described herein. For example, system 100 can facilitate in whole or in part mechanisms for satellite and/or ground-based wireless communication aggregation and slicing (in various embodiments, each satellite can be one of a HEO satellite, a MEO satellite, a LEO satellite, a micro-satellite, a nano-satellite, a pico-satellite, a femto-satellite, or any combination thereof, and each ground-based wireless communication component can be one of a cellular base station, a mobile communication device, a cellular phone, a 4G network element, a 5G network element, a 6G network element, or any combination thereof). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Referring now to FIG. 2A, this is a block diagram illustrating an example, non-limiting embodiment of a system (which can function fully or partially within the communication network of FIG. 1) in accordance with various aspects described herein. As seen in this figure, a logical architecture 200 can include hybrid access plane function (HAPF) 202 and UPF (User Plane Function)/Carrier Core/ Earth Stations 204. In this example, UPF/Carrier Core/Earth Stations 204 is configured for bi-directional communication with base station 206 (which can be, for example, 5G/6G cellular) and with LEO satellite 208. Further, in this example, HAPF 202 is configured for bi-directional communication with base station 206, with GEO satellite 210, with central server 212, and with mobile communication device 214.

Of note, and as discussed in more detail below, the HAPF 202 can be distributed among multiple devices. In various embodiments, the HAPF can be a distributed thin layer of software that covers a geographic area (see, e.g., FIG. 2A). The HAPF can be device agnostic (e.g., so that the HAPF can reside on phones, edge nodes, GPS, etc). The HAPF can be a mobile function that can be dispatched (e.g., based on emergency events) and/or can move along with a user (i.e., that user's corresponding UE). In various embodiments, all HAPFs can communicate with each other. Many such HAPFs can be augmented to assist each other (e.g., in case of traffic spikes). In various embodiments, the HAPF can function as a translator to fit regular wireless packets into satellite protocols. In various embodiments, the HAPF can function as a Satellite Proxy (e.g., extender/Earth Access Point). In various embodiments, the HAPF can have the capability to internally utilize the GPS communication interface.

Figure 2B:
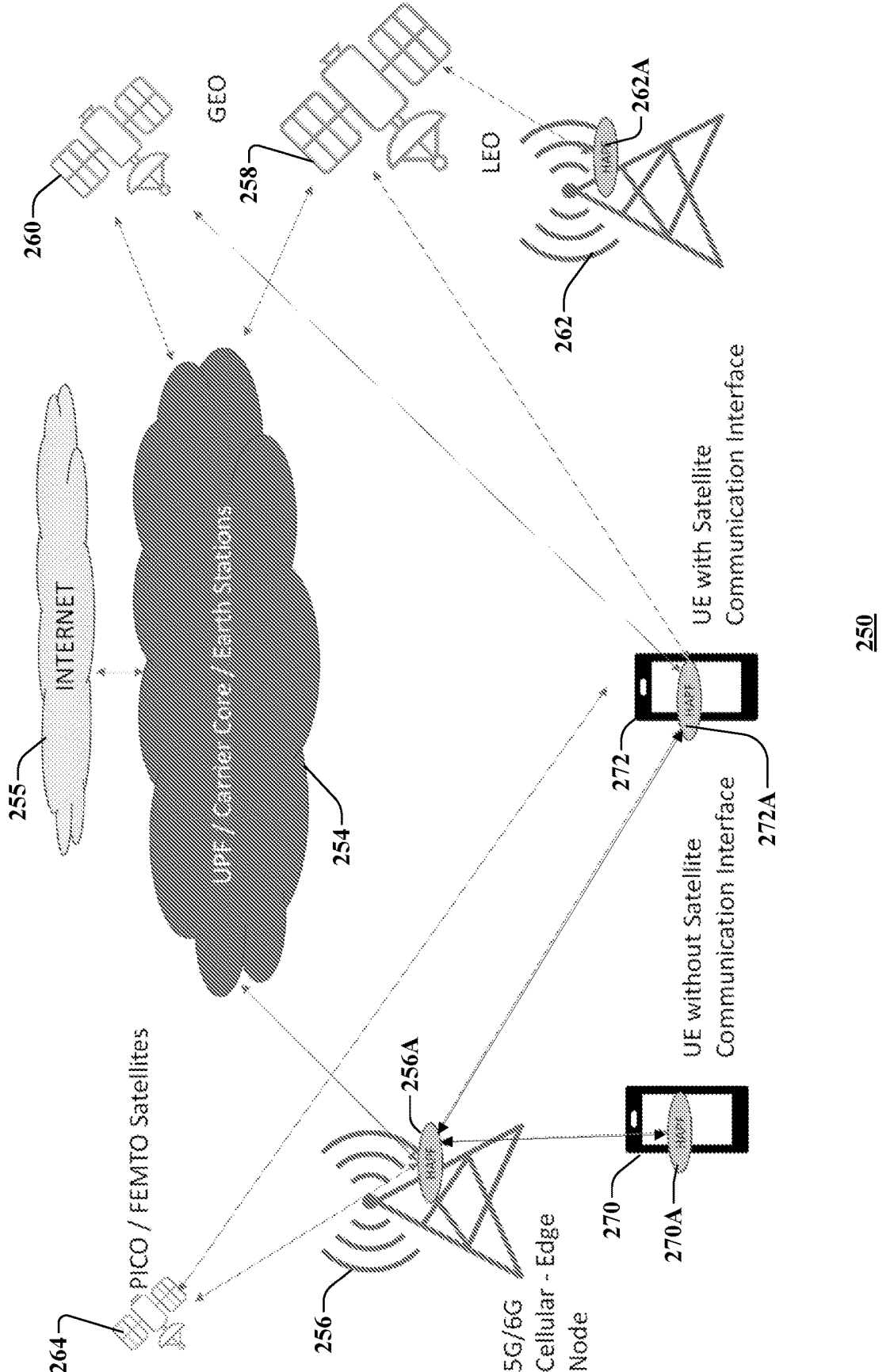
FIG. 2B is a block diagram illustrating an example, non-limiting embodiment of a system (which can function fully or partially within the communication network of FIG. 1) in accordance with various aspects described herein.

Referring now to FIG. 2B, this is a block diagram illustrating an example, non-limiting embodiment of a system (which can function fully or partially within the communication network of FIG. 1) in accordance with various aspects described herein. As seen in this figure, a physical architecture 250 can include Internet 255 configured for bi-directional communication with UPF(User Plane Function)/Carrier Core/Earth Stations 254. Further, 5G/6G cellular edge node 256 includes thereon HAPF element 256A, user equipment 270 (e.g., a smartphone) includes thereon HAPF element 270A, user equipment 272 (e.g., a smartphone) includes thereon HAPF element 272A, and 5G/6G cellular edge node 262 includes thereon HAPF element 262A. Further still, this example includes use of one or more satellites (including one or more micro/nano/pico/femto satellites 264, GEO satellite 260, and LEO satellite 258). Further still, in this example, various bi-directional communication paths can be configured among the user equipment, the edge nodes, and the satellites as shown.

Reference will now be made to various operation steps according to an embodiment as follows (see also, for example, FIG. 2B):

(a) Users download respective HAPF fragment into their devices (e.g., phones, IoTs, autonomous vehicles, etc.).

(b) Carriers equip their devices (e.g., ORAN, Edge, access points, etc.) with respective HAPF fragments.

(c) In a given geographical area, the HAPF fragments get aggregated to form a single HAPF system with a single decision-making engine. In one embodiment, a given HAPF fragment can contain an "anchor application" (such as a software module that installs itself on the device via intelligently detecting the device make/ model and acquires some of the networking resources (e.g., antenna)). In one embodiment, a HAPF system can contain a collection of HAPF fragments that elect one or more fragments with devices that have, for example, the highest CPU/Memory availability AND less movement, to be a decision maker for the temporary constructed HAPF system.

(d) The HAPF system enables the devices in the geographical area to have simultaneous connections to all available access points (e.g., different types of satellites, cellular network(s) from one or more carriers, mmWave, C Band, WiFi, Blue Tooth, etc.). This configuration can enable devices (e.g., phones) with no native satellite communications interface to connect to a satellite via the HAPF system.

(e) The HAPF coordinates change(s) of the communication anchor spectrum (and other aggregating links) based on apps in use via local detection by a respective HAPF fragment on a respective UE. In one example, a HAPF can latch onto higher satellite(s) and aggregate with LEO (similar to mmWave) for non-real-time or near-real-time communications leaving faster links available to real-time applications in this geographical area.

(f) The HAPF predicts (e.g., based on UE's movement and directions) which are the next channels that will be aggregators, main, and anchoring spectrum.

In various embodiments, the HAPF can reside on multiple devices (Hosts) in a single geographical area (see, e.g., FIG. 2B). The HAPF can control a portion of the antenna in each one of those devices (Hosts) and can send an identifying beacon for participant users' devices (in one example, the HAPF can control a portion of the antenna in a manner similar to a VM with dedicated networking resources). Each Host can be connected to one or more satellite types. The HAPF can select the more stable network end points (e.g., 5G/6G, LEO, GEO, MEO) to function as the anchor communication link and can use other available end points to aggregate the channel. The HAPF can coordinate (e.g., with occasional assistance of a backend server) the Carrier Aggregation elements as to which channel should be assigned as the anchor and which channel(s) should act as the aggregator(s). Each of the satellite(s) participating in communications can host a HAPF instance.

Reference will now be made to an "anchoring" aspect according to various embodiments as follows:

(a) When a phone is connected to a HAPF system, the HAPF system decision-maker instance will make one channel as the "anchor" (e.g., the most stable link and/or the link with the largest coverage) connecting the UE with the HAPF system;

(b) The HAPF system will provide direction to the HAPF fragment on the phone as to which channel is the "anchor" channel; and/or (c) The phone can connect directly to a given access point (in a case that the access point is reachable directly when the phone has a communication interface/chip for this access point (such as satellite)), or via one or more other devices that have HAPF fragments.

Reference will now be made to a "carrier aggregation" aspect according to various embodiments as follows:

(a) The HAPF system decision-maker instance will dictate to a given UE which channels/links should function as a carrier aggregator for the main link.

(b) The HAPF calculates the end to end (UE to UPF) bandwidth and delay on the different channels to calculate the main link (that should be high bandwidth and can have very small coverage such as mmWave) and the aggregator links (other links that provide comparable (little less) spectrum/bandwidth(BW). The HAPF fragment will generate a few packets on multiple channels for delay calculation; and/or (c) The HAPF fragment coordinates the transmission in the aggregation mode—for example: transmit 80% of the traffic on the main link and distribute the other 20% on the other channels.

Reference will now be made to a "safe mini satellite optical receivers (earth stations)" aspect according to various embodiments as follows:

(a) Intelligently deploy mini optical earth receivers in a safe manner;

(b) Optical receivers can be deployed on top of (and/or in) vehicles (e.g., cars, trucks, buses) and/or on existing cellular towers;

(c) The HAPF, via AI (for example, image processing of images taken by phone cameras, satellite imagery, and/or autonomous vehicle cameras) will direct the satellites in the coverage areas to direct optical signals to the mini satellite earth stations; and/or (d) When it is not safe for these satellites to transmit the light, the HAPF will direct the satellites to instead transmit on a traditional (e.g., cellular) wireless signal band.

Reference will now be made to a "central server (CS)" aspect according to various embodiments as follows:

(a) The CS manages multiple HAPFs aspects such as spinning up (or instantiating) these HAPFs on participant devices that have profiles stored in the CS;

(b) The CS has an inventory of the resources (e.g., phones, satellites, cell towers, etc.) and their capabilities;

(c) The CS sends commands to phones and other equipment to spin up (or instantiate) very light VMs and those VMs form a local HAPF;

(d) The CS manages and/or delegates the HAPF interaction with each device. The managing aspect can be done locally via a selected VM (e.g., part of the HAPF or remotely from the CS in case there is no capable VM locally);

(e) The CS aggregates historical data in terms of coverage and paths, as well as devices such as satellites and their capabilities for future use in terms of delay, QoS, communication session longevity;

(f) The CS employs AI/ML (artificial intelligence/machine learning) to optimize the work of the HAPF and its connections to the devices and to create the slices for aggregation; and/or (g) The AI/ML of the CS anticipates the movement of devices and satellites and optimizes the path selection.

Reference will now be made to an "intelligent slicing and carrier aggregation" aspect according to various embodiments as follows:

(a) The HAPF performs path analysis in terms of end-to-end travel time and bandwidth via multiple paths (e.g., by sending probing packets);

(b) The HAPF creates multiple sub-slices per application where every sub-slice takes a different route such as shown in the examples below:

UE→5G cell tower (via RF signal)

UE→Autonomous vehicle (via RF Signal)→Pico Satellite (via Terahertz Optical)

UE→Pico Satellite (via RF Signal)→LEO Satellite (via Terahertz Optical);

(c) The HAPF uses all sub-slices on different paths to push the traffic aggregated via multiple routes; and/or (d) The HAPF in a geographical area will select the route on ground and between satellites (satellite to satellite) and will command how satellites communicate together for an end-to-end path management.

Referring now to FIG. 2C, various steps of a method 2100 according to an embodiment are shown. As seen in this FIG. 2C, step 2102 comprises receiving, from a first communication device upon which a first component of a distributed application is installed, first data indicative of one or more first characteristics of the first communication device, wherein the first communication device is one of a plurality of communication devices associated with a communications network. Next, step 2104 comprises receiving, from a second communication device upon which a second component of the distributed application is installed, second data indicative of one or more second characteristics of the second communication device, wherein the second communication device is one of the plurality of communication devices associated with the communications network. Next, step 2106 comprises receiving, from a third communication device upon which a third component of the distributed application is installed, third data indicative of one or more third characteristics of the third communication device, wherein the third communication device is one of the plurality of communication devices associated with the communications network. Next, step 2108 comprises selecting, based at least in part upon the first data, the second data, and the third data, one of the second communication device and the third communication device to include in a first communication path between the first communication device and a satellite. Next, step 2110 comprises facilitating a first communication session between the first communication device and the satellite via the first communication path.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2D, various steps of a method 2200 according to an embodiment are shown. As seen in this FIG. 2D, step 2202 comprises selecting, based at least in part upon first data that characterizes a first device, second data that characterizes a second device, and third data that characteries a third device, a first communication path between the first device and a first satellite, wherein the first device comprises a first mobile cellular communication device, and wherein the first communication path uses one of the second and third devices but not both of the second and third devices. Next, step 2204 comprises facilitating a first communication session between the first device and the first satellite via the first communication path. Next, step 2206 comprises selecting, based at least in part upon fourth data that characterizes a fourth device, the second data that characterizes the second device, and the third data that characteries the third device, a second communication path between the fourth device and a second satellite, wherein the fourth device comprises a second mobile cellular communication device, wherein the second communication path uses one of the second and third devices but not both of the second and third devices. Next, step 2204 comprises facilitating a second communication session between the fourth device and the second satellite via the second communication path.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2E, various steps of a method 2300 according to an embodiment are shown. As seen in this FIG. 2E, step 2302 comprises obtaining, by a processing system including a processor, first location data indicative of a first physical location of a satellite. Next, step 2304 comprises obtaining, by the processing system, second location data indicative of a second physical location of mobile user equipment. Next, step 2306 comprises obtaining, by the processing system, one or more images of the second physical location while the mobile user equipment is at the second physical location. Next, step 2308 comprises determining, by the processing system, whether the satellite should direct optical energy at the user equipment while the user equipment is at the second physical location, wherein the optical energy would facilitate a communication between the satellite and the user equipment, wherein the determining is based at least in part upon the first location data, the second location data, and the one or more images, and wherein the determining results in a first determination. Next, step 2310 comprises responsive to the first determination being that the satellite should direct the optical energy at the user equipment while the user equipment is at the second physical location, instructing, by the processing system, the satellite to direct the optical energy at the user equipment while the user equipment is at the second physical location in order to effectuate the communication.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Reference will now be made to a number of device indicators according to various embodiments:

(a) Each device (e.g., phone or other mobile communication device) can have an indicator (e.g., in the form of one or more letters and/or one or more visual icons) to allude to a faster network coverage. The indicators can state, for example, "Premium Coverage", "Intelligent Connection," etc.

(b) User can have the option to turn on/off the indicator feature (e.g., HAPF enablement On/Off).

(c) When the HAPF feature is turned on, the device can have multiple connections at the same time via the HAPF.

(d) The HAPF can intelligently turn itself on/off (e.g., on one or more devices) based on the application(s) currently running and requitements in terms of security and QoS (Quality of Service).

Reference will now be made to a number of use cases according to various embodiments:

(a) A user connected to mmWave and the "anchor" is sub 6 band. However, the sub 6 band is busy. In response to the busy status, the HAPF can instead make a satellite the "anchor".

(b) A phone that does not have a satellite communications capability. In response to such lack of satellite communications capability, the HAPF can function as an indirect access point to one or more satellites.

(c) A busy or partially failed ORAN (Open Radio Access Network) needs other access points (such as satellites) to augment the traffic/service. The HAPF can provide such augmented traffic/service.

As described herein, various embodiments can support multiple devices (e.g., cellphones) during a time period when some (but, for example, not all) of the devices fully support satellite communications while some (but, for example, not all) of the devices do not have full satellite support capabilities.

As described herein, various embodiments can make satellite communications available to as many devices as possible.

As described herein, various embodiments can support advanced dynamic carrier aggregation and slicing that comprises optical (e.g., terahertz optical) and traditional wireless bands.

As described herein, various embodiments can operate in the context of the next generation satellites (such as a micro-satellite, a nano-satellite, a pico-satellite, a femto-satellite) that may have very limited processing power.

As described herein, various embodiments can intelligently deploy mini optical earth receivers in a safe manner.

As described herein, various embodiments can provide for satellite communications, for example, using cellphones that communicate via satellite and/or XW Internet via satellites. In one embodiment, communications can be implemented when one or more devices natively support satellite communications and one or more devices do not natively support satellite communications.

As described herein, various embodiments can provide for dual connectivity to both one or more satellites and also to one or more cellular connections. In one embodiment, network functions can be introduced at one or more locations in a network (e.g., at the cell towers).

As described herein, various embodiments can support advanced dynamic carrier aggregation and slicing that compromise optical and traditional wireless.

As described herein, various embodiments can provide for a smart layer to aggregate and make user equipment connect on traditional wireless and/or optical (wherein the process can be essentially transparent to users).

As described herein, various embodiments can operate in the context of utilizing optical earth receivers in a safe manner (for example, wherein the satellites are operated in a safe manner when they direct laser energy down to the earth).

As described herein, various embodiments can provide an integral method to enable each UE to communicate with multiple endpoints (e.g., to aggregate multiple types of communication, such as optical (e.g., laser) and traditional (e.g., cellular) wireless).

As described herein, various embodiments can provide for an access layer that acts as an umbrella that sits between all the users and all the access points.

As described herein, various embodiments can provide for communication paths including cellular tower to satellite via wireless to another satellite via optical with (for example) zero noticeable handoff.

As described herein, various embodiments can be dispatched based on emergency events and/or can be used to enhance user experience in some location(s).

As described herein, various embodiments can provide for allocating software fragments among devices (e.g., there is a file that is 10 megabits, there are 10 devices, and one or two megabits are allocated to each device).

As described herein, various embodiments can provide for distributed software that can reside on phones, and/or on one or more edge nodes, and/or on one or more IoT devices (e.g., a camera).

As described herein, various embodiments can provide for virtual machines that can be containers and/or can be serverless.

As described herein, various embodiments can provide for each device to donate as much resources as possible (e.g., physical memory space, bandwidth, resource block(s)).

As described herein, various embodiments can provide for resource allocation on demand (e.g., for a certain time period). In one example, if a device moves out of a particular geographical location, network resources that had been allocated to that device can be re-allocated.

As described herein, various embodiments can provide for HAPF software that utilizes a number of different elements (or "libraries").

As described herein, various embodiments can provide for intelligence (e.g., decision-making) in the RAN.

As described herein, various embodiments can provide for resource scheduling and/or control of one or more antennas, and/or utilization of one or more virtual machines.

As described herein, various embodiments can provide for a beacon to be sent from a device to a controller (e.g., to indicate that the device has certain resources (e.g., XXY bandwidth) available).

As described herein, various embodiments can provide for opportunistic selection of spectrum (e.g., obtain opportunistic access to millimeter wave; if the millimeter wave gets obstructed or moves away, fall back to the "anchor" which can be, for example, the C band).

As described herein, various embodiments can provide for selecting which (e.g., which user's) equipment to occupy (this can be based, for example, upon prior authorization).

As described herein, various embodiments can provide for selection of a device based upon highest CPU memory availability and/or less movement.

As described herein, various embodiments can provide for a new layer that functions as a service provider (which could be, for example, different from cellular and/or satellites).

As described herein, various embodiments can provide for selection of a device based upon an application being delay tolerant (e.g., sending an e-mail) or an application not being delay tolerant (e.g., watching a streaming movie).

As described herein, various embodiments can provide for utilization of safe mini satellite optical receivers that communicate with very small satellites (e.g., hovering around homes like tiny drones).

As described herein, various embodiments can provide for an optical signal from a satellite (e.g., a laser) being turned off (and, for example, RF wireless being used instead) when a large number of people are preset in the vicinity of the earth station. In one example, the mini satellite(s) can be orchestrated to work together as described herein.

As described herein, various embodiments can provide for a satellite/ground-based ecosystem. In one example, the ecosystem can handle billing and coordinate among various locations. In one specific example, a city such as New York can have 20 HAPFs and a server can coordinate amongst them, keep records, see who is using the devices, charge for service, and/or track compensation/rewards.

As described herein, various embodiments can provide for spinning up (or instantiating) one or more HAPFs as needed.

As described herein, various embodiments can provide for intelligence (e.g., decision-making) in the RAN and/or in a server (e.g., a central server).

As described herein, various embodiments can provide for intelligent slicing and carrier aggregation. In one example, intelligence can perform path analysis (and/or load balancing) in terms of end-to-end travel time and bandwidth. In one example, a path can be selected based upon distance and/or processing power (e.g., a pico-satellite that's very nearby, very close to you but very small processing power and very small bandwidth as opposed to a LEO, MEO or GEO that is very far compared to the pico-satellite but at the same time it has a much bigger delay).

As described herein, various embodiments can provide for a HAPF that creates multiple sub-slices per application (wherein, for example, every sub-slice takes a different route).

As described herein, various embodiments can provide for aggregation using combinations of both the optical and cellular.

As described herein, various embodiments can provide for selecting a path based upon an application running on a device (e.g., if the device is doing video streaming (which is sensitive to real-time effects) the decision-making can try to use a path that is as fast as possible; or, for example, if a device is sending an email (or other application that is not real-time sensitive), the decision-making can use a slower link).

As described herein, various embodiments can provide for selecting a path based upon movement of a device (e.g., if a particular device is moving (e.g., in a car) the decision-making can try to find a path that is most stable).

As described herein, various embodiments can provide for selecting a path based upon a user's behavior on a device.

As described herein, various embodiments can provide for a device to send back to a controller information about the device and/or user behavior (e.g., a need for security/encryption based upon the running of a banking application (which may require more security but that can tolerate a slower link)). In one example, a device can send back to a controller details of the device hardware (e.g., memory, processor speed), software, and/or firmware.

As described herein, various embodiments can provide for selecting a path based upon payment of a premium and/or a tier of a customer (e.g., if you're a high-paying customer and/or you pay the operator of a central server premium money, your device (e.g., phone) can be given a premium anchor (e.g., a business anchor)). In one example, a premium or business anchor can receive priority over other people. In another example, there are multiple tiers of anchors. In another example, first net responders can have a priority anchor.

As described herein, various embodiments can provide for communication in the context of natural disasters, disaster recovery, high traffic events, and the like.

As described herein, various embodiments can be implemented, for example, in the context of 6G next generation network architecture telecommunications carriers.

Figure 3:
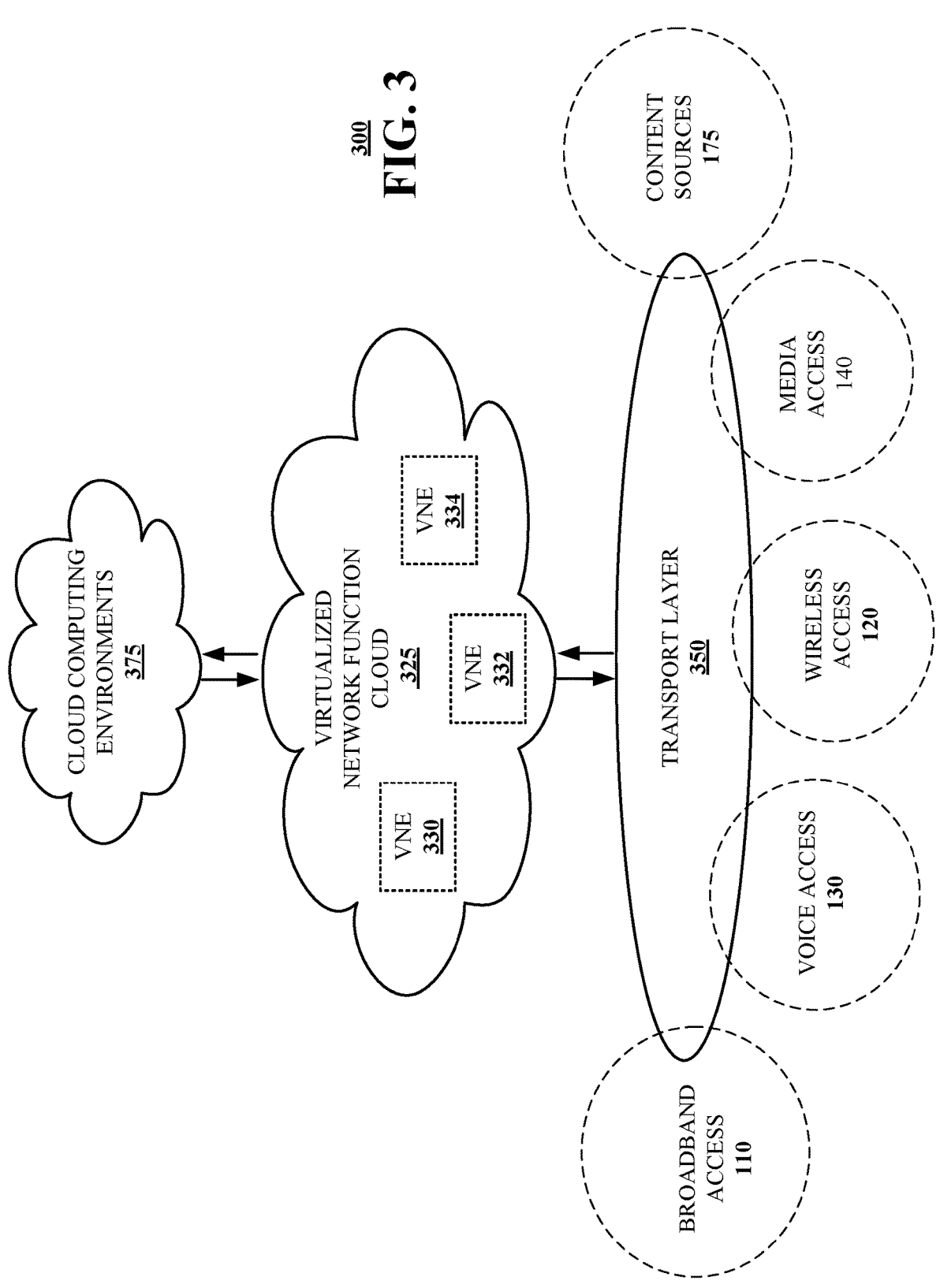
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, some or all of the subsystems and functions of system 200, some or all of the subsystems and functions of system 250, and/or some or all of the functions of methods 2100, 2200, 2300. For example, virtualized communication network 300 can facilitate in whole or in part mechanisms for satellite and/or ground-based wireless communication aggregation and slicing (in various embodiments, each satellite can be one of a HEO satellite, a MEO satellite, a LEO satellite, a micro-satellite, a nano-satellite, a pico-satellite, a femto-satellite, or any combination thereof, and each ground-based wireless communication component can be one of a cellular base station, a mobile communication device, a cellular phone, a 4G network element, a 5G network element, a 6G network element, or any combination thereof).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
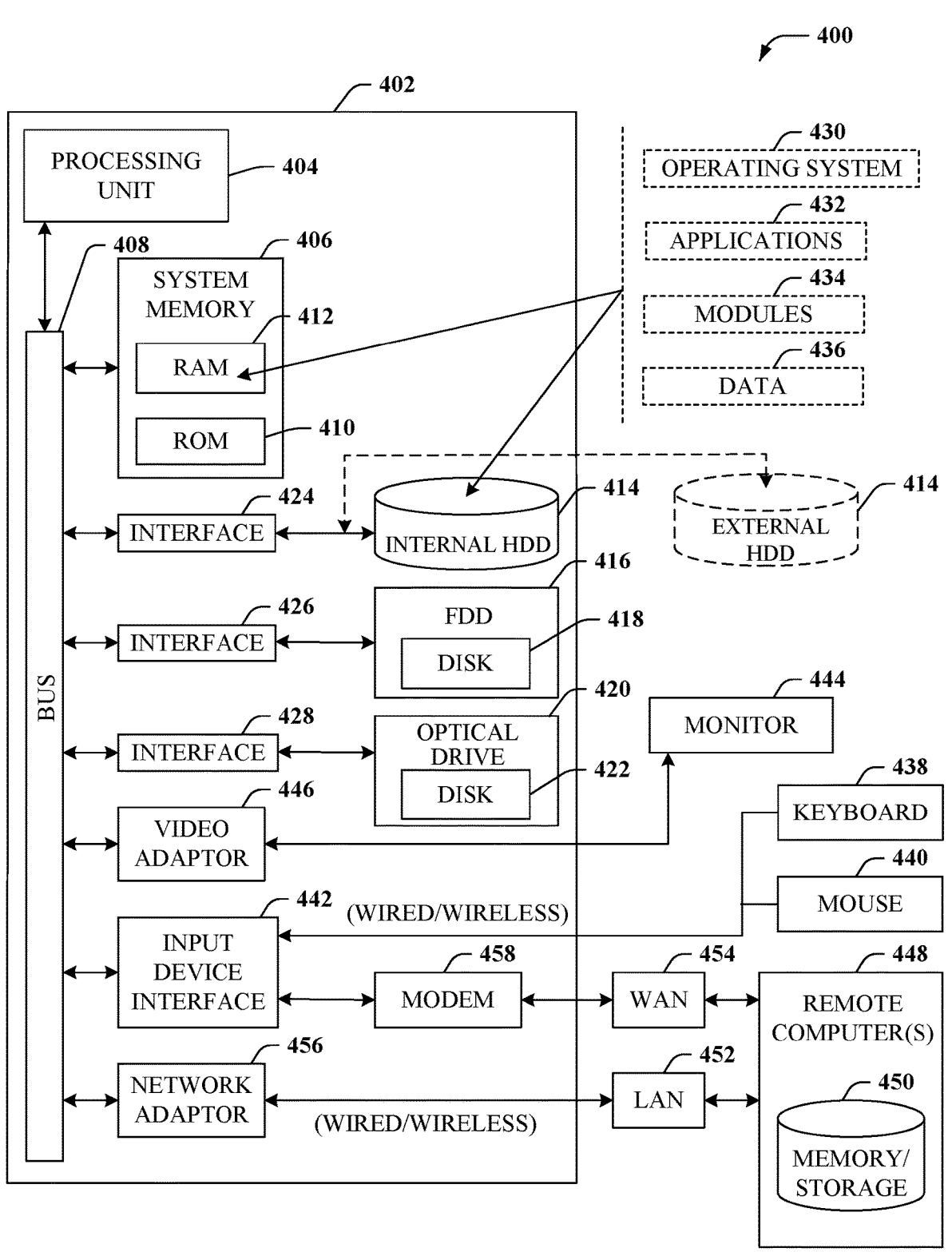
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part mechanisms for satellite and/or ground-based wireless communication aggregation and slicing (in various embodiments, each satellite can be one of a HEO satellite, a MEO satellite, a LEO satellite, a micro-satellite, a nano-satellite, a pico-satellite, a femto-satellite, or any combination thereof, and each ground-based wireless communication component can be one of a cellular base station, a mobile communication device, a cellular phone, a 4G network element, a 5G network element, a 6G network element, or any combination thereof).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
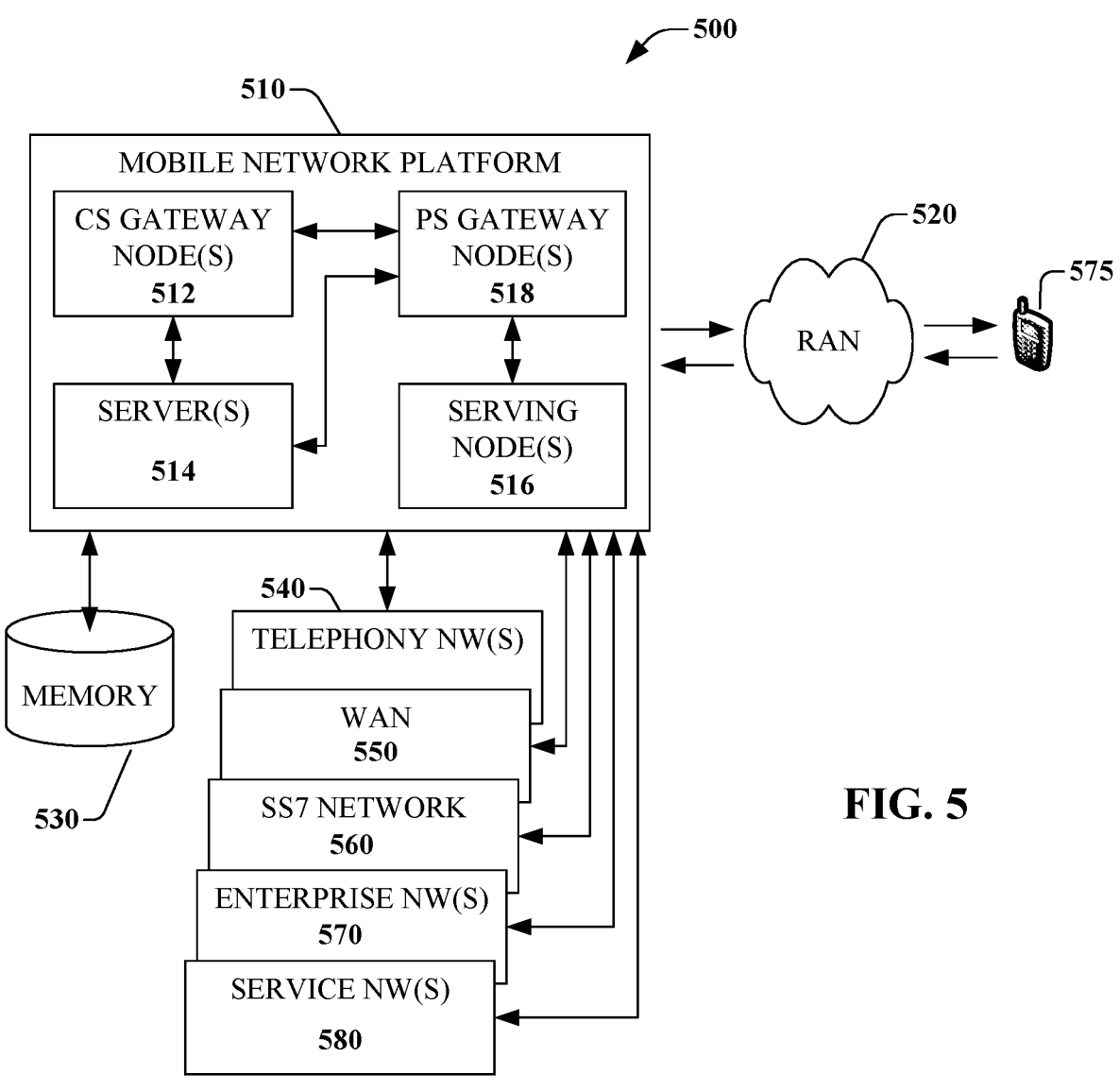
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part mechanisms for satellite and/or ground-based wireless communication aggregation and slicing (in various embodiments, each satellite can be one of a HEO satellite, a MEO satellite, a LEO satellite, a micro-satellite, a nano-satellite, a pico-satellite, a femto-satellite, or any combination thereof, and each ground-based wireless communication component can be one of a cellular base station, a mobile communication device, a cellular phone, a 4G network element, a 5G network element, a 6G network element, or any combination thereof). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
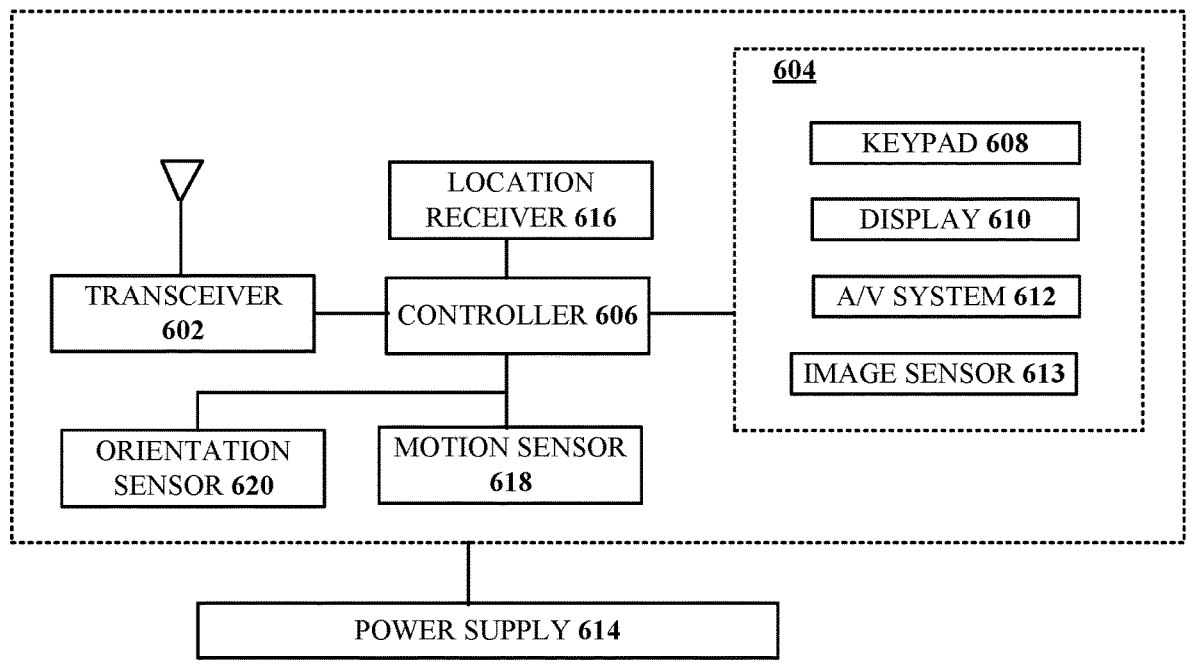
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part mechanisms for satellite and/or ground-based wireless communication aggregation and slicing (in various embodiments, each satellite can be one of a HEO satellite, a MEO satellite, a LEO satellite, a micro-satellite, a nano-satellite, a pico-satellite, a femto-satellite, or any combination thereof, and each ground-based wireless communication component can be one of a cellular base station, a mobile communication device, a cellular phone, a 4G network element, a 5G network element, a 6G network element, or any combination thereof).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically aggregating and slicing satellite and/or ground-based wireless communications) can employ various AI-based schemes for carrying out various embodiments thereof. Moreover, the classifier can be employed to determine a ranking or priority of each satellite, each satellite communication channel, each ground-based wireless communication device, and/or each ground-based wireless communication channel. A classifier is a function that maps an input attribute vector, x=(x₁, x₂, x₃, x₄ . . . xₙ), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the satellite(s), satellite communication channel(s), ground-based wireless communication device(s), and/or ground-based wireless communication channel(s) is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, facilitate performance of operations, the operations comprising:
receiving, from a first communication device upon which a first component of a distributed application is installed, first data indicative of one or more first characteristics of the first communication device, wherein the first communication device is one of a plurality of communication devices associated with a communications network;
receiving, from a second communication device upon which a second component of the distributed application is installed, second data indicative of one or more second characteristics of the second communication device, wherein the second communication device is one of the plurality of communication devices associated with the communications network;
receiving, from a third communication device upon which a third component of the distributed application is installed, third data indicative of one or more third characteristics of the third communication device, wherein the third communication device is one of the plurality of communication devices associated with the communications network;
selecting, based at least in part upon the first data, the second data, and the third data, one of the second communication device and the third communication device to include in a first communication path between the first communication device and a satellite; and
facilitating a first communication session between the first communication device and the satellite via the first communication path,
wherein the second communication device includes a first satellite communication interface that enables direct communication between the second communication device and the satellite,
wherein the third communication device includes a second satellite communication interface that enables direct communication between the third communication device and the satellite, and
wherein the first communication device is incapable of direct communication with the satellite.

2. The device of claim 1, wherein each of the plurality of communication devices comprises a respective end-user device, a respective mobile communication device, a respective fixed communication device, a respective access-point, a respective cellular base-station, a respective satellite, or any respective combination thereof.

3. The device of claim 1, wherein:
the one or more first characteristics comprises first processing speed, first memory capacity, first memory availability, first communication bandwidth, first upload latency, first download latency, first upload speed, first download speed, or any first combination thereof;
the one or more second characteristics comprises second processing speed, second memory capacity, second memory availability, second communication bandwidth, second upload latency, second download latency, second upload speed, second download speed, or any second combination thereof; and
the one or more third characteristics comprises third processing speed, third memory capacity, third memory availability, third communication bandwidth, third upload latency, third download latency, third upload speed, third download speed, or any third combination thereof.

4. The device of claim 1, wherein the first communication path includes both the first communication device and the second communication device.

5. The device of claim 1, wherein the first communication path excludes one of the second communication device or the third communication device.

6. The device of claim 1, wherein each of the first component of the distributed application, the second component of the distributed application, and the third component of the distributed application are a same component of the distributed application.

7. The device of claim 1, wherein at least one of the first component of the distributed application, the second component of the distributed application, and the third component of the distributed application is a different component of the distributed application than at least one other of the first component of the distributed application, the second component of the distributed application, and the third component of the distributed application.

8. The device of claim 1, wherein the operations further comprise receiving, from a fourth communication device upon which a fourth component of the distributed application is installed, fourth data indicative of one or more fourth characteristics of the fourth communication device, wherein the fourth communication device is one of the plurality of communication devices associated with the communications network.

9. The device of claim 8, wherein:
the operations further comprise selecting, based at least in part upon the fourth data, the second data, and the third data, one of the second communication device and the third communication device to include in a second communication path between the fourth communication device and the satellite; and
facilitating a second communication session between the fourth communication device and the satellite via the second communication path.

10. The device of claim 8, wherein:
the operations further comprise selecting, based at least in part upon the fourth data, the second data, and the third data, one of the second communication device and the third communication device to include in a second communication path between the fourth communication device and another satellite; and
facilitating a second communication session between the fourth communication device and the another satellite via the second communication path.

11. The device of claim 1, wherein:
the distributed application is a distributed software application; and
the executable instructions are part of the distributed software application.

12. The device of claim 1, wherein:
the first component of the distributed application is installed on the first communication device as first software, first hardware, first firmware, or any first combination thereof;

the second component of the distributed application is installed on the second communication device as second software, second hardware, second firmware, or any second combination thereof; and the third component of the distributed application is installed on the third communication device as third software, third hardware, third firmware, or any third combination thereof.

13. The device of claim 1, wherein the satellite comprises a geosynchronous satellite, a medium-earth-orbit satellite, a low-earth-orbit satellite, a micro-satellite, a nano-satellite, a pico-satellite, a femto-satellite, or any combination thereof.

14. The device of claim 1, wherein:

the first communication device is first mobile end-user equipment;

the second communication device is a one of second mobile end-user equipment or a first cellular base station; and the third communication device is a one of third mobile end-user equipment or a second cellular base station.

15. The device of claim 1, wherein:

the first communication device is a first cellular base station;

the second communication device is a one of first mobile end-user equipment or a second cellular base station; and the third communication device is a one of second mobile end-user equipment or a third cellular base station.

16. A non-transitory machine-readable medium comprising executable instructions that, when executed by a processing system including a processor, facilitate performance of operations, the operations comprising:

selecting, based at least in part upon first data that characterizes a first device, second data that characterizes a second device, and third data that characterizes a third device, a first communication path between the first device and a first satellite, wherein the first device comprises a first mobile cellular communication device, and wherein the first communication path uses, as a first intermediary device, one of the second and third devices but not both of the second and third devices;

facilitating a first communication session between the first device and the first satellite via the first communication path, which includes the first intermediary device;

selecting, based at least in part upon fourth data that characterizes a fourth device, the second data that characterizes the second device, and the third data that characterizes the third device, a second communication path between the fourth device and a second satellite, wherein the fourth device comprises a second mobile cellular communication device, wherein the second communication path uses, as a second intermediary device, one of the second and third devices but not both of the second and third devices; and facilitating a second communication session between the fourth device and the second satellite via the second communication path, which includes the second intermediary device.

17. The non-transitory machine-readable medium of claim 16, wherein:

the first communication path is different from the second communication path;

the first communication path uses one or more of a plurality of additional communication devices;

the second communication path uses one or more of the plurality of additional communication devices;

the first mobile cellular communication device comprises a first smartphone;

the second mobile cellular communication device comprises a second smartphone;

the selecting of the first communication path is based at least in part upon which of the second and third devices can provide a lowest latency link between the first device and the first satellite; and the selecting of the second communication path is based at least in part upon which of the second and third devices can provide a highest bandwidth link between the fourth device and the second satellite.

18. A method comprising:

obtaining, by a processing system including a processor, first location data indicative of a first physical location of a satellite;

obtaining, by the processing system, second location data indicative of a second physical location of mobile user equipment;

obtaining, by the processing system, one or more images of the second physical location while the mobile user equipment is at the second physical location;

determining, by the processing system, whether the satellite should direct optical energy at the mobile user equipment while the mobile user equipment is at the second physical location, wherein the optical energy would facilitate a communication between the satellite and the mobile user equipment, wherein the determining is based at least in part upon the first location data, the second location data, and the one or more images, and wherein the determining results in a first determination; and responsive to the first determination being that the satellite should direct the optical energy at the mobile user equipment while the mobile user equipment is at the second physical location, instructing, by the processing system, the satellite to direct the optical energy at the mobile user equipment while the mobile user equipment is at the second physical location in order to effectuate the communication.

19. The method of claim 18, wherein:

the optical energy is one of laser energy, terahertz frequency spectrum, or any combination thereof;

the mobile user equipment is installed on a vehicle;

the satellite is one of a micro-satellite, a nano-satellite, a pico-satellite, or a femto-satellite; and the determining makes the first determination based upon:

the first and second location data indicating that there is a line-of-sight path between the satellite and the mobile user equipment; and the one or more images indicating that there is a sufficient probability, that meets a threshold, that no person will be adversely impacted by the optical energy directed from the satellite to the mobile user equipment.

20. The method of claim 18, further comprising:

determining by the processing system, in a case that the optical energy is being directed from the satellite to the mobile user equipment, whether a person will subsequently be impacted by the optical energy directed from the satellite to the mobile user equipment, resulting in a second determination; and responsive to the second determination being that a person will subsequently be impacted by the optical energy directed from the satellite to the mobile user equipment, instructing, by the processing system, the satellite to cease directing the optical energy at the mobile user equipment.

* * * * *